June 25, 1940.　　J. F. McMENAMIN　　2,205,799
MACHINE TOOL FIXTURE
Filed Nov. 24, 1937　　3 Sheets-Sheet 1

INVENTOR
JAMES F. McMENAMIN
BY
ATTORNEY

June 25, 1940.  J. F. McMENAMIN  2,205,799
MACHINE TOOL FIXTURE
Filed Nov. 24, 1937  3 Sheets-Sheet 2
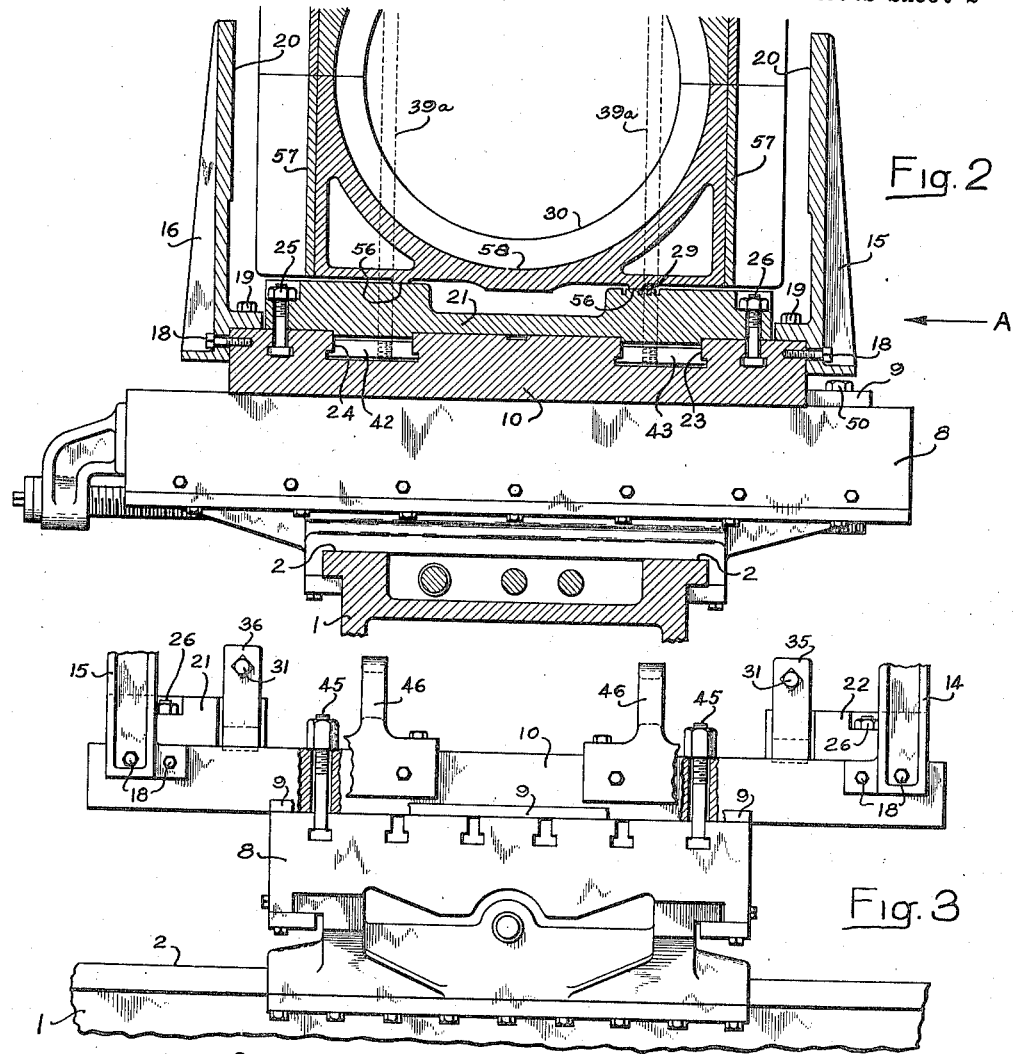
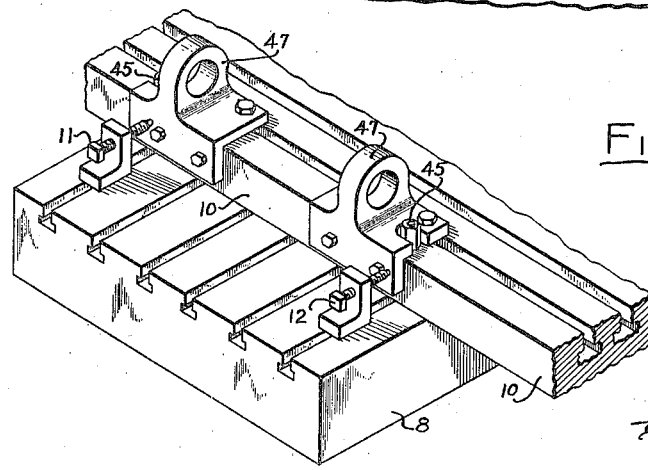
INVENTOR
JAMES F. McMENAMIN
BY
ATTORNEY Patented June 25, 1940

2,205,799

UNITED STATES PATENT OFFICE 2,205,799

MACHINE TOOL FIXTURE

James F. McMenamin, Philadelphia, Pa.

Application November 24, 1937, Serial No. 176,302

10 Claims. (Cl. 77—62)

This invention relates generally to machine tool equipment and more particularly to an improved universal fixture to permit a machine tool to accurately and efficiently bore elements such as roller bearing axle housings for railway trucks and locomotive drivers.

In certain types of roller bearing axle housings, the housing entirely encloses the axle and extends completely between the roller bearings at each end thereof. Such housings may be either of the split type bolted together or a one piece casting. In either case it is of the utmost importance that the roller bearing recesses in the opposite ends of the housings should have precision alignment and positioning not only with respect to each other but also to the pedestal liners. However, such precision has heretofore involved an exceedingly tedious machining operation requiring utmost care in setting up the housing or work piece on the machine tool and properly aligning the same during the successive machining operations of the two ends of the housing.

It is an object of my invention to provide an improved universal fixture that will facilitate the setting up and accurate machining in a single spindle machine tool of roller bearing recesses or other surfaces in opposite ends of a work piece such as roller bearing axle housings. My improved equipment embodies fundamentally a fixed frame supporting a base that can be turned through 180° to bring the ends of the base, and the work piece mounted thereon, alternatively adjacent the single tool head together with datum means such as cooperating lining surfaces or cooperating inscribed lines formed respectively on the frame and base to determine precisely a predetermined position of the longitudinal center line of the base with assurance of establishing said position regardless of which end of the base is adjacent the machine spindle and tool head thereon. My invention further contemplates in cooperation with the foregoing means whereby a work piece may be accurately centered on the base with respect to said datum means.

Other objects and advantages will be more apparent to those skilled in the art from the following description of the accompanying drawings in which:

Fig. 2 is a transverse sectional view taken substantially on the line 2—2 of Figs. 1 and 5;

Fig. 3 is a side elevation viewed substantially in the direction of the arrow A in Figs. 1 and 2, parts of the fixture being broken away to show details of construction;

Fig. 4 is a fragmentary perspective looking at the left corner of Fig. 1 in the general direction of the arrow B;

Figure 1:
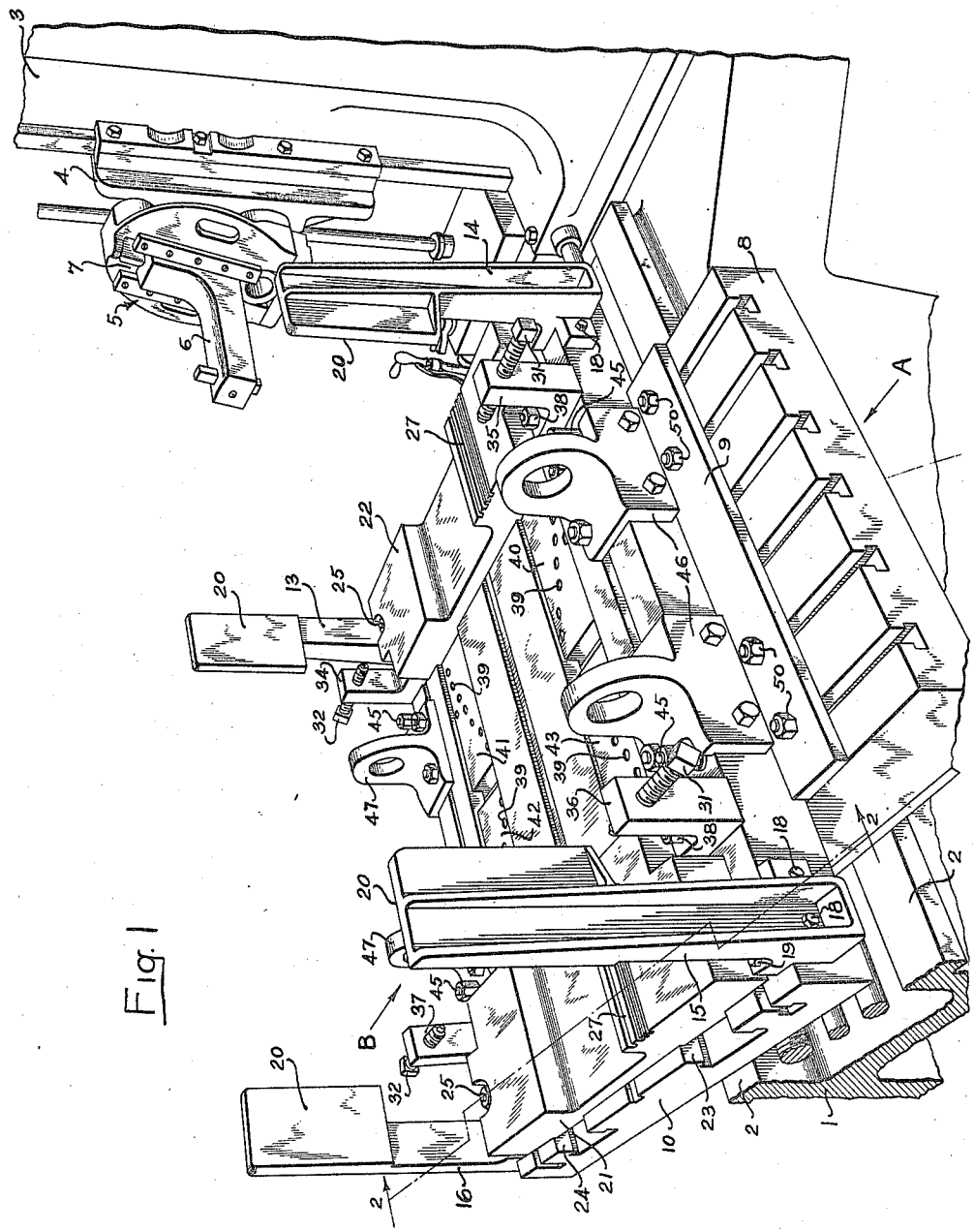
Fig. 1 is a perspective of my improved fixture as applied to a fragmentary portion of a machine tool.

The particular embodiment of the invention, such as is disclosed herein merely for the purpose of illustrating one specific form among possible others that the invention might take in practice, is shown as applied to a standard form of horizontal boring machine which may be of any one of several usual types herein diagrammatically illustrated as comprising a frame 1 having horizontal parallel guideways 2, a pedestal or column 3 projecting upwardly from one end of frame 1, a carriage 4 vertically slidably mounted upon column 3 and a rotatable boring head 5 carrying a tool holder 6 which is radially adjustable for feeding movement in a slideway 7. Head 5 is supported upon a usual horizontal rotatable spindle not shown. A work table 8 is supported upon guideways 2 to be movable thereover both longitudinally and transversely through any usual screw and nut arrangement such as is customary with machine tools of this type. For purposes of this invention the work table may be considered as being immovable transversely of guideways 2 but movable longitudinally thereof for feeding purposes if desired. However, the table in so far as centering the same or locating the work piece thereon with respect to the datum means is concerned, may be considered as part of the frame.

Figure 5:
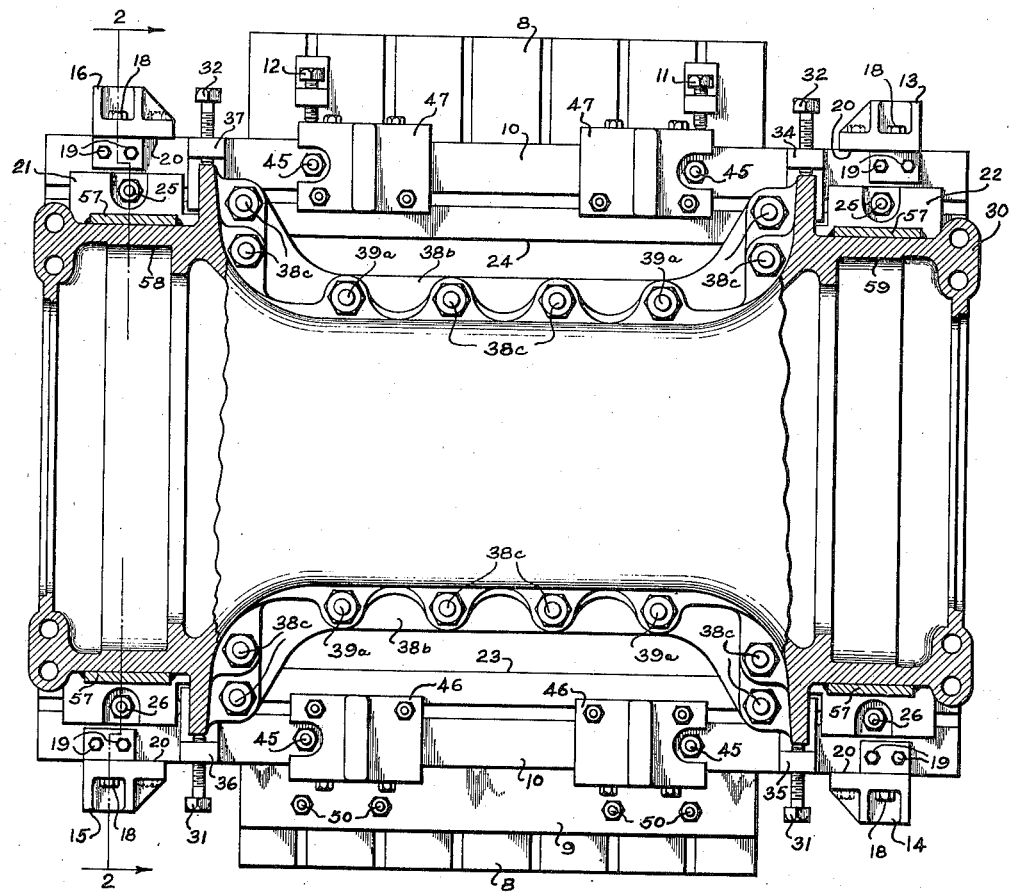
Fig. 5 is a plan view of an axle housing positioned in my improved fixture, parts of the housing being broken away to show the bearing recesses to be machined.

My improved fixture includes specifically what might be termed a precision lining strip 9 rigidly secured to table 8. A base 10 of my fixture is supported on table 8 against the inner edge of lining strip 9 and is held against the same by screws 11 and 12, Fig. 4, which screws are supported in suitable brackets secured to the left side of table 8. Precision centering brackets or arms 13, 14, 15 and 16 are rigidly secured as by bolts 18 and 19 to base 10 at substantially the four corners thereof. Each of these brackets is provided with enlarged micrometer gauging surfaces such as indicated at 20 to facilitate placing a micrometer against the same in centering the axle housing or work piece in a manner to be described. The surfaces 20 of brackets 13 and 16 and also the surfaces 20 of brackets 14 and 15 lie in common parallel planes laterally disposed equal distances from the longitudinal center line of the base. Supported on top of fixture base 10 are suitable members 21 and 22 for supporting the axle housing in elevated position, these elevating members being longitudinally adjustably guided in guideways 23 and 24 extending the length of base 10. Normally the elevating members are firmly held in position to base 10 by T-head bolts 25 and 26, Figs. 1 and 2. A series of longitudinal grooves 27 are formed in one side of each of elevating members 21 and 22 to receive temporary lining or stop members 29, Fig. 2. Depending upon the size of the housing 30, these strips may be placed in any one of the several grooves shown. To shift the housing 30 after it is placed upon members 21 and 22, I have provided at opposite ends of the base two sets of opposed shifting screws 31 and 32 adjustably threadedly secured in brackets 34, 35, 36 and 37. Each of these brackets is firmly secured to base 10 as by bolts 38. To clamp the housing in position, suitable cross-bars and bolts may extend over the housing and downwardly along each side thereof especially if the housing is of the one piece integral type, or if of the split type as shown in Figs. 2 and 5 the holding bolts 39a may extend directly through say four of the bolt openings in the housing mating flanges 38b which are secured together by a series of bolts 38c. The holding bolts are threaded in any one of a series of conveniently located threaded bolt holes 39 formed in slidable nut blocks 40, 41, 42 and 43. These blocks slide in T-shaped guideways 23 and 24 so as to be properly clamped in the T bottom thereof when the holding bolts are tightened. Fixture base 10 is held to work table 8 by any suitable T-head bolts 45. Two pairs of lifting eyes 46 and 47 are secured to each side of the fixture base 10 to permit the whole fixture and housing to be bodily lifted away from work table 8 by a crane and then rotated 180°. While various of the foregoing elements are shown as bolted to the base 10, it will of course be understood that such elements could be cast or welded integrally therewith if desired.

In operation, the precision lining strip 9 or shoulder 9 is initially positioned exactly parallel to the axis of the machine tool spindle, which rotatably drives the boring head 5, at a distance from a vertical plane containing said spindle axis equal to one-half the width of fixture base 10 and both sides of the fixture base have parallel finished cooperating lining surfaces. After the lining strip 9 is positioned it is firmly clamped in position by bolts 50. The fixture base 10 is then placed on work table 8 and one of its parallel cooperating surfaces brought firmly against lining strip 9 and held thereto by bolts 11 and 12, Fig. 4. The base is then secured to work table 8 by a series of bolts 45, Fig. 3. The axle housing 30, Fig. 2, is now placed on top of elevating members 21 and 22 with the housing extending lengthwise of the base as shown in Fig. 5. The housing is provided on its under surface with longitudinal machined datum bosses 56 from which measurements for all machined surfaces are determined. The housing is provided with customary hardened pedestal liners 57, and it is necessary that the roller bearing recesses 58 and 59 at opposite ends of the housing shall be not only in precision axial alignment with each other but also that such bearing axis shall be transversely located, with precision, midway between the pairs of pedestal liners 57 at each end of the housing. Also that the bearing axis shall be at right angles to the vertical axes of the liners 57. This relation can be obtained by setting the machined datum bosses directly on the elevating members 21 and 22, thereby normally establishing a level position of the housing although if such level position is not obtained the housing may be raised at either end by shims interposed between the bosses 56 and elevating members 21 and 22. The principal function, however, of my improved fixture as used with a housing is to obtain precision centering of the bearing axis with respect to the pedestal liners 57 and after the bearing recess is machined at one end of the housing, then to permit the fixture housing to be bodily rotated 180° for machining the bearing recess at the other end of the housing while maintaining a high degree of precision axial alignment of the two bearing recesses and the centering of the axis with respect to the pedestal liners.

Upon placing the housing upon the elevating members 21 and 22, the datum bosses, say on the right side of the housing, Fig. 2, are initially brought into contact with the preliminary housing stops 29 supported in the grooves 27, Fig. 1, in each of the elevating members. Several grooves are provided to accommodate different size housings. To obtain the precision axial alignment, the two sets of screws 31 and 32, Fig. 1, are then brought into contact with any suitable portion of the housing so as to shift the same laterally, that is transversely, as may be necessary to center the housing. To determine the precise centering of the housing, suitable micrometer measurements are taken between the surfaces 20 of brackets 15 and 16, Figs. 1 and 2, and the surfaces of liners 57. The sets of screws say 31 and 32 are used to shift the housing until the above mentioned micrometer-measured distances are precisely equal. Similar shifting and measuring operations are also made for the other end of the housing with respect to surfaces 20 of brackets 13 and 14. When the housing is precisely centered, it is then suitably clamped by U-bolts or other means engaging the threaded openings 39 in blocks 40 to 43. The tool head 5 is then rotated and the bearing recess in one end of the housing suitably machined whereafter screws 11 and 12, Fig. 4, are released and a four chain crane hooked into the four eyes 46 and 47 to lift and bodily turn the fixture base 10 and housing together with the elements connected thereto through 180°. The parallel cooperating lining surface of base 10 is then firmly pressed against lining means 9 whereupon screws 11 and 12, Fig. 4, are firmly tightened. Thereupon the bearing recess at the other end of the machine can be machined with complete assurance that all of the desired precision relations of the machined parts are obtained. It will of course be understood that during machining of the bearing recesses, the tool arm 6 may be fed radially in any usual manner to effect the desired depth of cut and also the work table 8 may be moved longitudinally to effect relative axial feeding movement between the tool and housing, or, depending upon the type of machine, the tool head 5 may be moved axially.

Aside from the foregoing advantages of precision positioning of the machined surfaces and bearing axis, my improved fixture and method of alignment and measurement has the further advantage of providing maximum access to the bearing recesses during the machining operations in order to make necessary micrometer measurements of the diameter of the recesses. Due to the tool holder 6 being in an offset position relative to the machine tool spindle axis, it is seen that a micrometer may be placed directly across the center of the recess without any obstruction from the tool holder. Also considerable free space is available for the operator to adjust his micrometer and to read the same without in any way being unnecessarily restricted or cramped. This not only expedites the measuring operation but also increases the probable accuracy of measuring.

From the foregoing disclosure it is seen that I have provided an extremely effective method and apparatus for machining relatively large structure members with a high degree of precision and to be able to do so with a standard machine tool that may be used for a variety of other boring work upon removal of my improved fixture. In this manner I avoid the necessity for a special machine tool adapted to machine only housings which would entail a large initial investment that would remain idle except when used for machining a limited volume of special work pieces.

It will of course be understood that various changes in details of construction and arrangement of parts may be made by those skilled in the art without departing from the spirit of the invention as set forth in the appended claims.

I claim:

1. Apparatus for machining opposite ends of a work piece comprising, in combination, a machine tool having a frame and a spindle at one end thereof, a fixture having a base supported by said frame, means for holding a work piece on said base with one end thereof adjacent said spindle, a longitudinally extending position stop shoulder on said frame for engaging with abutting contact either longitudinal edge of said base, and means whereby said fixture base and a workpiece thereon may be bodily turned through 180° to bring the other end of said base adjacent said spindle and to bring said base and shoulder into transverse abutting engagement with each other, said shoulder being so transversely located that regardless of which end of said base is adjacent said spindle the longitudinal center line of said base has a single predetermined relation to the spindle axis.

2. The combination set forth in claim 1 further characterized by the provision of substantially opposed micrometer gauging surfaces between which a work piece is normally disposed at certain predetermined distances therefrom.

3. Apparatus for machining opposite ends of a work piece comprising, in combination, a machine tool having a frame and a tool spindle at one end thereof, a fixture having a base supported by said frame, means whereby said fixture base and a work piece thereon may be bodily turned through 180° to bring the opposite ends of the base alternatively adjacent said spindle, mutually abutting lining surfaces associated respectively with said frame and base and so related with respect to the frame and base and to the spindle axis that the longitudinal center line of said base is maintained in a single position regardless of which end of the base is adjacent said spindle, and means providing a laterally disposed micrometer gauging surface for locating a work piece on said base.

4. The combination set forth in claim 3 further characterized by the provision of means for transversely shifting either end of a work piece relative to the fixture base to center a work piece thereon.

5. The combination set forth in claim 3 further characterized in that said cooperating lining surfaces include a lining shoulder having a fixed relation to the machine tool frame and a pair of parallel surfaces formed respectively on opposite longitudinal sides of the fixture base equal distances from the longitudinal center line thereof whereby either one of said parallel surfaces is adapted to abut against said fixed lining shoulder to maintain the center line of the base in a single position regardless of which end of said base is adjacent the spindle.

6. The combination set forth in claim 3 further characterized in that said means for forming the micrometer gauging surface is secured to said base so as to move therewith during bodily turning thereof.

7. The combination set forth in claim 3 further characterized by the provision of stop members associated with said base to effect a preliminary positioning of a work piece thereon prior to its final positioning.

8. The combination set forth in claim 3 further characterized by the provision of crane engaging eyes secured to said base whereby the same may be bodily lifted and rotated.

9. The combination set forth in claim 3 further characterized by the provision of work piece anchoring blocks slidably supported by said base.

10. The combination set forth in claim 3 further characterized by the provision of work piece elevating members supported on said base at longitudinally spaced points thereof.

JAMES F. McMENAMIN.